United States Patent [19]

Quan

[11] Patent Number: 4,544,943
[45] Date of Patent: Oct. 1, 1985

[54] STABILIZED COLOR TELEVISION SUBCARRIER REGENERATOR CIRCUIT

[76] Inventor: Ronald Quan, 10910 Wunderlich Dr., Cupertino, Calif. 95014

[21] Appl. No.: 557,316

[22] Filed: Dec. 2, 1983

[51] Int. Cl.$^4$ .......................... H04N 9/50; H04N 9/46
[52] U.S. Cl. ........................................ 358/25; 358/19; 358/326
[58] Field of Search .......................... 358/25, 19, 326; 331/20, 18

[56] References Cited

U.S. PATENT DOCUMENTS 4,291,332 9/1981 Kato et al. ............................ 358/19

*Primary Examiner*—John C. Martin
*Assistant Examiner*—Michael P. Dunnam

[57] ABSTRACT

A subcarrier regenerator circuit for use in color television receiver demodulators. The regenerator includes a voltage-controlled oscillator and a fixed frequency oscillator set to the nominal subcarrier frequency. During the vertical retrace period, a phase detector forces the output of the voltage-controlled oscillator to match that of the fixed-frequency oscillator. The output of the detector is also stored. During the active vertical scan, the phase detector compares the voltage-controlled oscillator output with the color burst synchronization signal and produces an output which is added with the stored output. The added signal is used to adjust the output of the voltage-controlled oscillator to match the color burst signal in phase and frequency, so that the output can be used by the synchronous color signal demodulators.

12 Claims, 2 Drawing Figures

STABILIZED COLOR TELEVISION SUBCARRIER REGENERATOR CIRCUIT

TECHNICAL FIELD

The present invention relates generally to color television receiver circuits and more particularly to a subcarrier regenerator circuit for use in demodulating chrominance signals.

BACKGROUND ART

The video portion of color television signals includes both luminance and chrominance information. The luminance information relates to the monochome portion of the signal, whereas the chrominance information refers to the hue and saturation of the signal. The chrominance information involves two variables (usually designated I and Q), which are used to amplitude and phase modulate a subcarrier signal which, in the United States, has a frequency of 3.58 MHz.

A television receiver employs synchronous detectors to demodulate the subcarrier signal in order to detect the I and Q variables. The chrominance portion of the transmitted signal also includes a phase reference to be used by the subcarrier regenerator or local oscillator of the synchronous detectors of the receiver to reproduce the 3.58 MHz subcarrier. The phase reference, commonly called the color-synchronizing burst, or simply color burst signal, is a short sample of unmodulated subcarrier transmitted during the horizontal blanking period after each horizontal sync pulse. The subcarrier regenerator or local oscillator, which is usually a stable, quartz crystal-controlled oscillator, is phase-locked to the color burst signal once each television line.

If the video signal is recorded on a video tape recorder, the color burst signal is frequently degraded in phase or frequency as a result of recorder wow or flutter. If the degradation is significant, the crystal-controlled local oscillator may not be capable of maintaining a phase lock with the burst signal. If a lower Q oscillator is used, such as an LC oscillator, the oscillator may drift between burst signals thereby resulting in color distortion. In addition, the LC oscillator output frequency may drift sufficiently from the subcarrier frequency such that the oscillator locks on a color burst sideband signal which differs from the color burst signal by multiples of the line frequency. In either case, the television receiver picture color is unacceptable.

In order to compensate for degradation in the video signals produced by video tape recorders, such recorders sometimes utilize chroma stabilizers or color correction circuits. One such circuit is commonly referred to as a time base corrector which compensates for wow and flutter by adding or subtracting a delay in the recorder output. Another approach is called heterodyning, which utilizes a burst continuation oscillator. Both of these approaches are unsatisfactory in that they significantly increase the cost of the video tape recorder. In addition, the heterodyning circuit significantly reduces the video bandwidth, thereby causing the picture to smear or appear out of focus.

The present invention overcomes the above-noted limitations of chroma stabilizers. The disclosed invention is incorporated in the receiver rather than in the recorder and may be implemented at low cost. In addition, the video bandwidth is not reduced. These and other advantages of the present invention will become apparent to those skilled in the art after having read the following Best Mode for Carrying Out the Invention, together with the drawings.

DISCLOSURE OF THE INVENTION

A subcarrier regenerator circuit for use in a television receiver is disclosed. The regenerator circuit includes a fixed-frequency regenerator oscillator, preferably quartz crystal-based, having an output set to the nominal subcarrier frequency. A second, variable frequency oscillator, such as a voltage-controlled oscillator, is also provided, which is controlled by error detection circuitry. The error detection circuitry compares the output of the variable oscillator with that of the fixed-frequency oscillator and with a color burst signal derived from the television receiver video signal and controls the variable oscillator in response to the comparisons. The output of the variable frequency oscillator tracks the color burst signal in phase and frequency during the active vertical scan and is to be used by the television synchronous chroma demodulator circuits.

The error detection circuitry preferably includes a phase detector having one input which is connected through a switch to the fixed-frequency or reference oscillator during the vertical retrace period and to the color burst signal during the active vertical scan. A second phase detector input is connected to the output of the variable frequency oscillator. The error signal output of the phase detector is connected to an error signal processing circuit which includes a two-input signal summing network. A signal storage circuit, such as a sample-and-hold circuit, is associated with one of the inputs of the summing network. A second switch is provided for switching the output of the phase detector between the two inputs of the signal summing network.

During the vertical retrace period, the phase detector compares the variable frequency oscillator with the reference oscillator. The error signal output of the phase detector is coupled through a first input of the summing circuit to the variable oscillator and adjusts the frequency and phase of the oscillator to match that of the reference oscillator. At the same time, the phase detector error signal is stored in the storage circuit associated with the first input. During the active vertical scan, the reference oscillator output is replaced by the color burst signal. In addition, the output of the phase detector is switched from the first input to the second input of the summing circuit. The summing circuit adds the error signal retained in the storage circuit with the present error signal to provide a composite error signal which adjusts the variable frequency oscillator output to match the phase and frequency of the color burst signal.

BEST MODE FOR CARRYING OUT THE INVENTION

Figure 1:
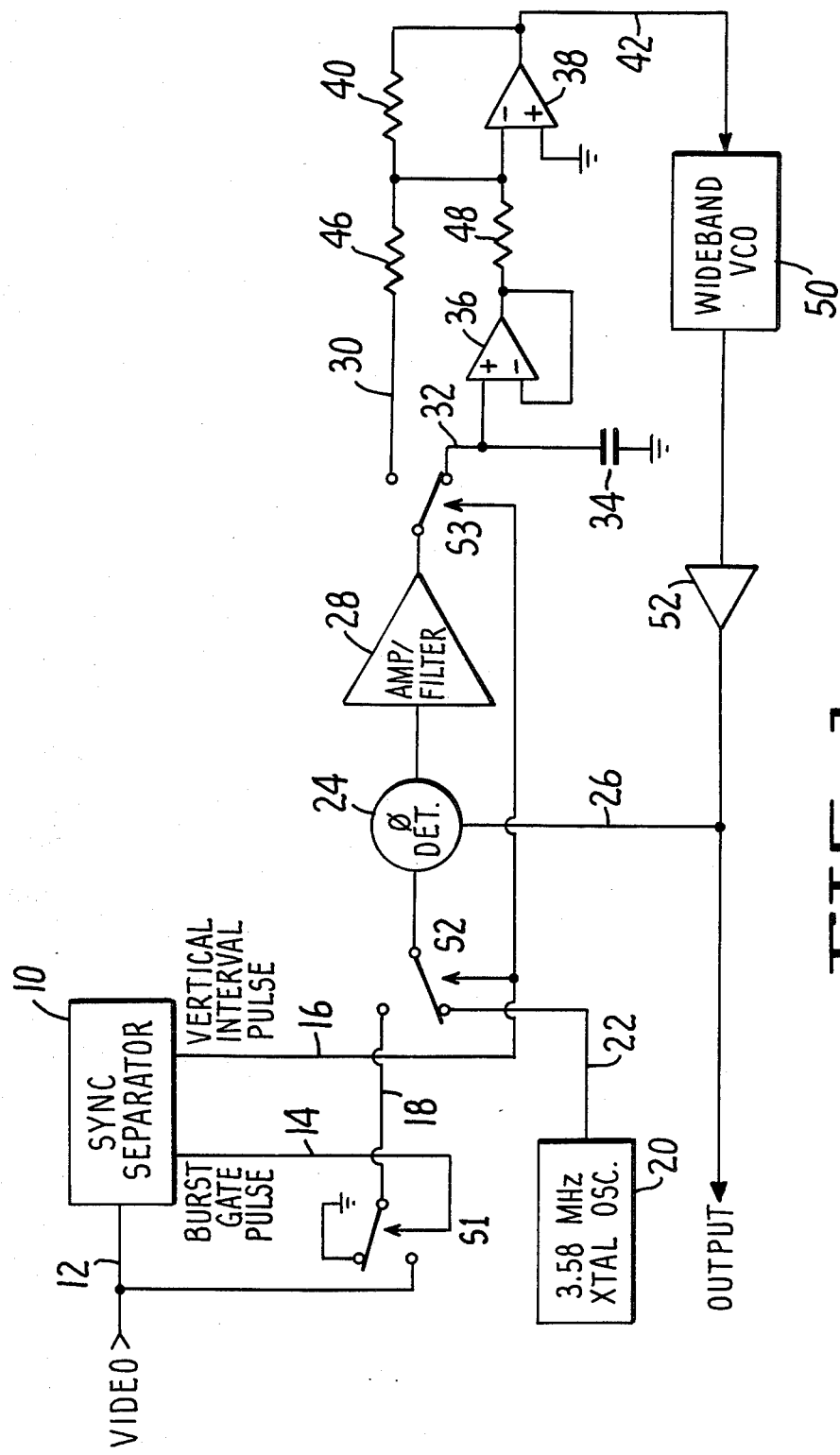
FIG. 1 is a block diagram of the subject invention.

Referring now to FIG. 1 of the drawing, the subject subcarrier regenerator circuit includes a sync separator circuit 10 which receives a video signal on line 12 from the video detector (not shown) of the television receiver. The term television receiver as used herein includes television receivers, monitors, recorders and other apparatus which receive television-type signals and demodulate such signals to extract video information. The sync separator 10 provides a digital burst gate pulse on line 14 once every television line when the color burst signal is present. Separator 10 also provides a digital vertical interval pulse signal on line 16 between fields (two fields per frame) during the vertical retrace period.

A conventional digitally-actuated, single pole, double throw analog switch S1 is included having one throw contact connected to line 12 which carries the video signal and the other throw grounded. The pole of switch S1 is connected to a line 18 and the digital control input is connected to the line 14. Thus, when the color burst signal is present, switch S1 connects the video signal on line 12 to line 18. At other times, line 18 is grounded.

A second digitally-actuated single pole, double throw switch S2 is provided which has one throw contact connected to line 18 and another throw contact connected to the output of an oscillator 20 on line 22. Oscillator 20 is a conventional, quartz crystal-controlled oscillator having a 3.58 MHz output which is the nominal color subcarrier frequency in the United States. The pole of switch S2 is connected to one input of a conventional phase detector 24. The control input of switch S2 is connected to line 16 which carries the vertical interval pulse. Thus, during the vertical retrace interval, switch S2 connects one of the inputs of phase detector 24 to the output of oscillator 20. During other times, the input of detector 24 is connected to the pole of switch S1.

The second input of phase detector 24 is connected to the output of the subject regenerator circuit on line 26. The D.C. output of phase detector 24 is connected to the pole of a third, digitally-actuated switch S3 through a D.C. amplifier and filter circuit 28. One throw contact of switch S3 is connected to a voltage summing network via line 30. The remaining throw contact of the switch S3 is connected to a sample-and-hold circuit through line 32. The control input of the switch is connected to line 16 which carries the vertical interval pulse. Thus, during the vertical retrace interval, the filtered output of phase detector 24 is connected to the input of the sample-and-hold circuit at line 32. When the vertical scan is active, the detector output is connected to the summing network input on line 30.

The sample-and-hold circuit includes a capacitor 34 having one terminal grounded and the other terminal connected to line 32 and to the non-inverting input of a conventional operational amplifier 36. The inverting input is connected to the output of amplifier 36 to form a unity gain voltage follower circuit.

The voltage summing circuit includes another operational amplifier 38 having its non-inverting input grounded. A feedback resistor 40 is connected between the inverting amplifier input and the output on line 42. A pair of summing resistors 46 and 48 are also connected to the inverting of input amplifier 38. The remaining terminals of resistors 46 and 48 are connected to line 30 and the output of amplifier 36, respectively.

The subject regenerator circuit further includes a voltage-controlled oscillator circuit 50 having the control input coupled to line 42. Oscillator 50 is a wideband oscillator having an output centered at 3.58 MHz. The output of oscillator 50 is coupled to the output of the subject regenerator circuit on line 26 through a buffer amplifier 52.

Figure 2:
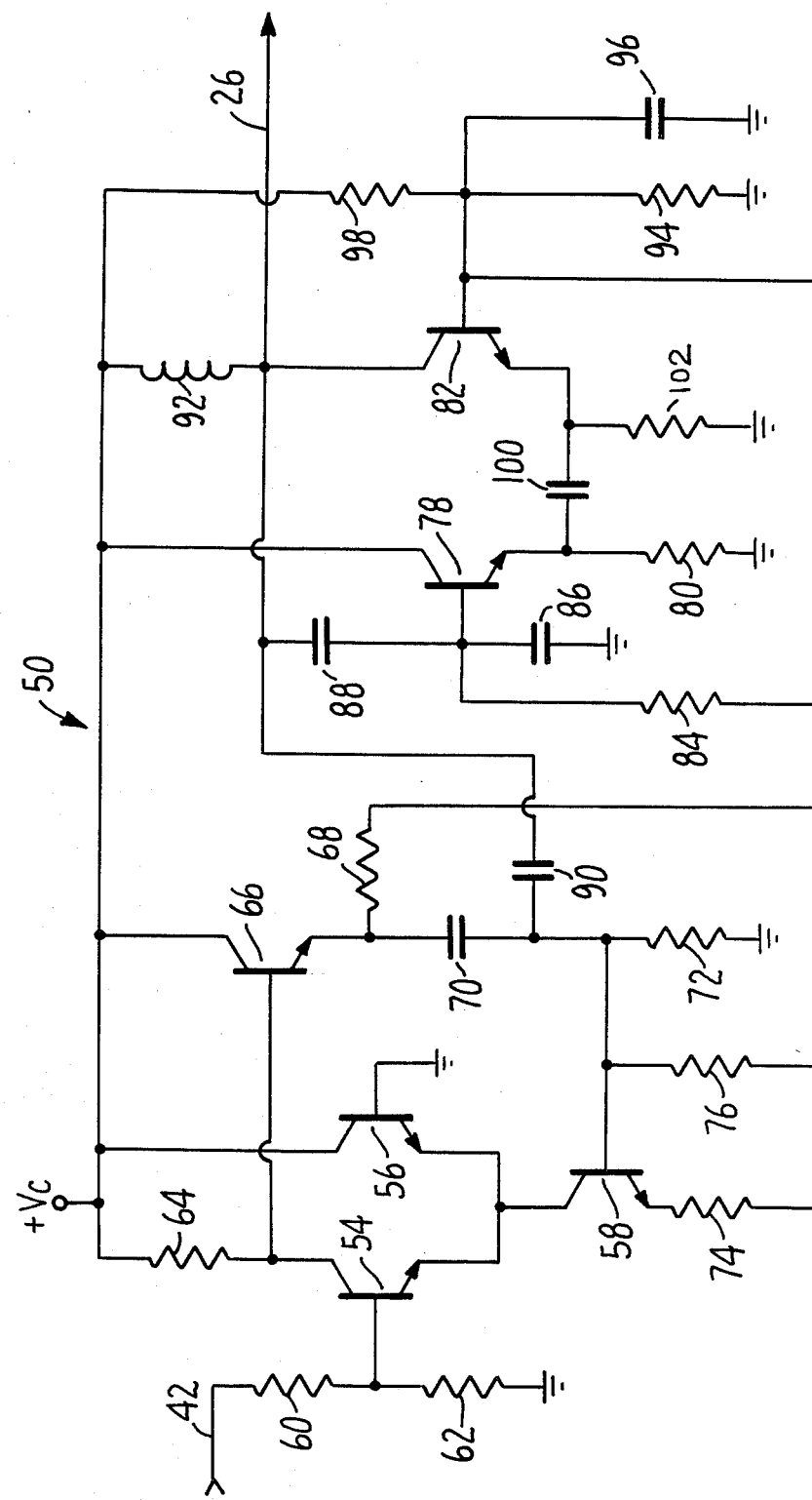
FIG. 2 is a schematic of a voltage-controlled oscillator circuit suitable for use in the subject invention.

The details of an exemplary voltage-controlled oscillator 50 suitable for use with the present invention are shown in FIG. 2. It is to be understood that other wideband oscillator circuits would also be acceptable. Oscillator 50 includes a pair of NPN transistors 54 and 56, each having its emitter connected to the collector of a third NPN transistor 58. The base of transistor 54 is connected to the control signal on line 42 through a resistor 60. A second resistor 62 is connected between the base of transistor 54 and ground.

The collector of transistor 54 is coupled to a positive power supply voltage +Vc through a collector resistor 64. The collector is also connected to the base of another NPN transistor 66. The collector of transistor 56 is connected directly to supply voltage +Vc as is the collector of transistor 66. The base of transistor 56 is grounded.

The emitter of transistor 66 is connected to a negative power supply voltage −Vc through a resistor 68. The emitter is also connected to one terminal of a capacitor 70 with the other terminal being connected to the base of transistor 58. The base of transistor 58 is also connected to ground via a resistor 72 and to negative voltage −Vc by way of resistor 76, with the emitter being connected to the voltage −Vc through a resistor 74. As will subsequently be described, transistors 54, 56, 58 and 66, together with capacitor 70 and the associated resistors form a voltage-controlled capacitor circuit.

Oscillator 50 further includes an NPN transistor 78 having its collector connected to voltage +Vc and its emitter connected to ground via a resistor 80. The base of transistor 78 is connected to the base of another NPN transistor 82 through a resistor 84. The base of transistor 78 is also connected to ground through a capacitor 86 and to the output of the oscillator at line 26 through a second capacitor 88. A third capacitor 90 is connected between the output of the voltage-controlled capacitor section at the the base of transistor 58 and output line 26.

An inductor 92 is included which is connected between positive voltage +Vc and the collector of transistor 82. The collector is also connected to output line 26. The base of transistor 82 is coupled to ground via parallel-connected resistor 94 and capacitor 96 and to supply voltage +Vc through resistor 98. Finally, the emitter of transistor 82 is coupled to the emitter of transistor 78 through a capacitor 100 and to ground via a resistor 102.

Having described the construction of the subject subcarrier regenerator circuit, the operation of the circuit will now be given. The wideband oscillator 50 depicted in FIG. 2, as previously noted, includes a voltage-controlled capacitor section and an oscillator section. The oscillator section is comprised of transistors 78 and 82, inductor 92 and the associated capacitors and resistors. The frequency of oscillation is dependent primarily on the value of inductor 92 and the effective capacitance at the junction between the inductor and capacitors 88 and 90. The values of the capacitors and inductors are selected to achieve the desired output center frequency of 3.58 MHz.

The effective capacitance provided to inductor 92 can be varied over a limited range in response to the D.C. signal provided on input line 42. Transistors 54, 56, 66 and 58 form a voltage-controlled amplifier circuit. The gain of the circuit is a function of the magnitude of the current flow through transistor 54 which is, in turn, determined by the magnitude of the voltage at the control input on line 42. For relatively high magnitude control signals, the gain of the amplifier is the ratio of the value of resistors 64 and 74. For smaller control signals, the gain approaches zero. Capacitor 70 is effectively connected between the output of the voltage-controlled amplifier and the inverting input. Thus, the effective capacitance at the output, commonly referred to as the Miller capacitance, is equal to the gain of the amplifier times the sum of the value of capacitance 70 and one. The effective capacitance will vary approximately from the value of capacitor 70 to the value of the capacitor times the ratio of resistors 64 and 74, assuming that the ratio is relatively high.

The operation of the individual remaining components of the subject subcarrier regenerator circuit are conventional and will not be described.

During the vertical retrace period, when video information is not present, the vertical interval pulse signal on line 16 will cause switch S2 to couple the output of crystal oscillator 20 to phase detector 24. The phase detector will produce a D.C. output which corresponds to the phase difference between oscillator 20 and the output of wideband voltage-controlled oscillator 50.

The vertical interval pulse will also cause switch S3 to couple the filtered output of phase detector 24 to the input of unity-gain amplifier 36. The error voltage output of amplifier 36 will pass through the summing circuit to line 42. Since resistor 46 is open, the output of the summing circuit on line 42 will be inversely proportional to the output of amplifier 36. The error signal on line 42 will drive the wideband voltage-controlled oscillator to the output frequency of oscillator 20, which is set precisely to 3.58 MHz.

When the vertical field is active, a burst gate pulse will be produced on line 14 by sync separator 10 during the time when the color burst signal is present. The gate pulse will cause switch S1 to connect the color burst signal present on line 12 to the output of switch S1. Since the vertical interval pulse is not present when the vertical field is active, the video signal at the output of switch S1 will be connected to phase detector 24 by switch S2 while the color burst signal is produced. In addition, switch S3 will connect the buffered output of the phase detector to line 30 of the summing circuit.

Capacitor 34 of the sample-and-hold circuit will be charged up to a voltage which corresponds to the error signal produced during the previous vertical retrace period. Since switch S3 is disconnected from capacitor 34 during the vertical active field and since the input impedance of amplifier 36 is very high, the charge on capacitor 34 will remain unchanged until the next vertical retrace period. Accordingly, the summing circuit will add the output of phase detector 24 produced during the active vertical field with that produced during the retrace period. The combined error signal at the output of the summing circuit causes the wideband oscillator 50 to be in phase lock with the incoming color burst signal. Thus, the subcarrier regenerator produces an output signal during the following active vertical period which tracks the color burst signal. Even though the color burst signal may have deviated significantly in phase or frequency from the nominal 3.58 MHz value, the locally-produced subcarrier signal will exactly match the color burst signal thereby correcting for recorder wow and flutter.

It can be seen that during each vertical retrace period, wideband oscillator 50 is set to precisely 3.58 MHz thereby achieving what can be termed a rough tune of the oscillator. During the active field, the oscillator is set exactly to the phase and frequency of the color burst signal every line period, thereby fine-tuning the oscillator.

Thus, a novel subcarrier regenerator circuit for television receivers has been disclosed. Although a preferred embodiment has been described in some detail, such details are intended to be illustrative only, since changes and alterations can be made by those skilled in the art without departing from the spirit and scope of the subject invention as defined by the appended claims.

I claim:

1. A subcarrier regenerator circuit for use in a television receiver comprising:
   first oscillator means for producing a regenerator output signal at a frequency controlled by a control signal applied to a control input of said first oscillator means;
   second oscillator means for producing a second output signal at a predetermined subcarrier frequency;
   color burst means for producing a color burst signal derived from a video signal detected by the television receiver; and
   error detection means for comparing said regenerator output signal with said second output signal and with said color burst signal and producing said control signal in response to said comparisons.

2. The regenerator circuit of claim 1 wherein said error detection means includes storage means for storing a first error signal produced in response to a comparison between said second output signal and said regenerator output signal.

3. The regenerator circuit of claim 2 wherein said error detection means produces a second error signal in response to a comparison between said regenerator output signal and said color burst signal and includes summing means for producing said control signal in response to the summation of said first and second error signals.

4. The regenerator circuit of claim 3 wherein said error detection means includes a phase detector.

5. The regenerator circuit of claim 4 wherein said storage means includes a sample-and-hold circuit.

6. The regenerator circuit of claim 5 wherein said error detecting means includes first switching means for switching an input of said phase detector between said second oscillator means and said color burst means.

7. The regenerator circuit of claim 6 wherein said first switching means switches said input of said phase detector means to said second oscillator means during the vertical retrace period of the video signal.

8. The regenerator circuit of claim 7 wherein said summing means includes a first input for receiving said first error signal and a second input for receiving said second error signal and said error detecting means includes second switching means for switching an output of said phase detector between said first and second inputs of said summing means.

9. The regenerator circuit of claim 8, wherein said second switching means switches said output of said phase detector to said first input of said summing means during the vertical retrace period of the video signal.

10. A subcarrier regenerator circuit for use with a television receiver comprising:
    a phase detector having first and second inputs;
    a voltage-controlled oscillator having a regenerator output connected to said first input of said phase detector;
    a fixed-frequency oscillator;

a first switch for switching said second input of said phase detector between said fixed-frequency oscillator and a color burst signal derived from the television receiver video signal;

error signal processing circuit means for producing a control signal for said voltage-controlled oscillator in response to an output of said phase detector;

switching control means for causing said first switch to switch said fixed-frequency oscillator to said phase detector during the vertical retrace period of the video signal.

11. The subcarrier regenerator circuit of claim 10 wherein said error signal processing circuit means includes first and second inputs and a storage means for storing a signal applied to said first input of said processing circuit means and a second switch for coupling said output of said phase detector to said first and second inputs of said processing circuit means and wherein said switching control means is also a means for causing said second switch to switch said output of said phase detector to said first input of said error signal processing means during the vertical retrace period of the video signal.

12. A method of generating a television receiver color subcarrier signal to be used by the receiver color signal synchronous demodulators comprising the following steps:

generating a subcarrier output signal in response to a control signal;

generating a second output signal at a predetermined subcarrier frequency;

detecting a color burst signal from a video signal provided by the receiver;

making a first phase comparison between said subcarrier output signal and said second output signal during the vertical retrace period of the video signal;

making a second phase comparison between said subcarrier output signal and the color burst signal; and generating said control signal in response to said first and second phase comparisons.

* * * * *

UNITED STATES PATENT AND TRADEMARK OFFICE
CERTIFICATE OF CORRECTION

PATENT NO. : 4,544,943
DATED : October 1, 1985
INVENTOR(S) : Ronald QUAN

It is certified that error appears in the above—identified patent and that said Letters Patent is hereby corrected as shown below:

On the title page, the assignee should read as follows:

--[73] Assignee: SONY CORPORATION, Tokyo, Japan--.

Signed and Sealed this

Twenty-fifth Day of February 1986

[SEAL]

Attest:

DONALD J. QUIGG

Attesting Officer

Commissioner of Patents and Trademarks